(12) United States Patent
Danz et al.

(10) Patent No.: US 7,248,153 B2
(45) Date of Patent: Jul. 24, 2007

(54) METHOD FOR PARKING A VEHICLE

(75) Inventors: Christian Danz, Stuttgart (DE);
Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 10/504,216

(22) PCT Filed: Dec. 16, 2002

(86) PCT No.: PCT/DE02/04585

§ 371 (c)(1),
(2), (4) Date: Jan. 25, 2005

(87) PCT Pub. No.: WO03/070517

PCT Pub. Date: Aug. 28, 2003

(65) Prior Publication Data

US 2005/0122234 A1    Jun. 9, 2005

(30) Foreign Application Priority Data

Feb. 19, 2002    (DE) .................... 102 06 764

(51) Int. Cl.
*B60Q 1/00*        (2006.01)
*G08G 1/14*        (2006.01)
*G08G 7/78*        (2006.01)
*G01S 13/00*       (2006.01)
*G06F 17/10*       (2006.01)

(52) U.S. Cl. .............. 340/435; 340/436; 340/903; 340/932.2; 340/933; 342/27; 342/59; 342/70; 701/300; 701/301

(58) Field of Classification Search ........ 340/435–436, 340/903, 932.2, 933; 342/70, 27, 59; 701/300–301
See application file for complete search history.

(56) References Cited

U.S. PATENT DOCUMENTS

| | | | | |
|---|---|---|---|---|
| 4,931,930 A | * | 6/1990 | Shyu et al. ................ 701/36 |
| 5,754,123 A | * | 5/1998 | Nashif et al. ............. 340/903 |
| 6,061,002 A | * | 5/2000 | Weber et al. ........... 340/932.2 |
| 6,323,887 B1 | * | 11/2001 | Shiraishi et al. ........... 347/115 |
| 6,339,369 B1 | * | 1/2002 | Paranjpe ................... 340/436 |
| 6,476,730 B2 | * | 11/2002 | Kakinami et al. ....... 340/932.2 |
| 6,621,421 B2 | * | 9/2003 | Kuriya et al. ........... 340/932.2 |
| 6,683,539 B2 | * | 1/2004 | Trajkovic et al. ....... 340/932.2 |
| 6,696,931 B2 | * | 2/2004 | Paranjpe ................... 340/436 |
| 7,095,361 B2 | * | 8/2006 | Mattes et al. ............... 342/70 |

FOREIGN PATENT DOCUMENTS

| | | |
|---|---|---|
| DE | 38 13 083 | 11/1989 |
| DE | 196 16 447 | 10/1997 |
| DE | 197 44 185 | 4/1999 |

\* cited by examiner

*Primary Examiner*—Daniel Wu
*Assistant Examiner*—Lam Pham
(74) *Attorney, Agent, or Firm*—Kenyon & Kenyon LLP

(57) ABSTRACT

A method for parking a vehicle in which distances of the vehicle from obstacles as well as the length and/or width of a parking space are determined. Sensors are used for parking space determination as well as distance measurement in this context.

13 Claims, 1 Drawing Sheet

METHOD FOR PARKING A VEHICLE

FIELD OF THE INVENTION

The present invention relates to a method for parking a vehicle.

BACKGROUND INFORMATION

Measuring devices, in particular ultrasonic measuring devices, for warning a motor vehicle of the approach of an obstacle are conventional. An information signal is provided to the driver visually and/or acoustically as a function of distance. In particular, this renders it possible to prevent impact with obstacles that are not visible to the driver or for which the distance is difficult to estimate. However, if a parking space is too small to accommodate the vehicle, such a measuring device only provides the driver with limited assistance since the driver may unsuccessfully attempt to park the vehicle in the parking space. German Patent Application No. DE 196 16 447 describes a method for determining the length of a parking space and a parking assistance device suitable for the method via which the length of a parking space between a front and a back parked vehicle is determinable when driving slowly past. However, the described parking assistance device does not allow measurement of the distance to obstacles during the parking operation so that the driver is responsible for monitoring these distances during the parking operation.

SUMMARY

An example the method of the present invention may have the advantage that the sensors on the side of the vehicle are used to determine the length of the parking space as well as to determine the distances between the vehicle and obstacles, e.g., in the form of boundaries to the parking space, during the parking operation. As a result, the example method of the present invention facilitates effective parking since the driver is directed to a suitable parking space and is also warned of possible impact during the parking operation. The partially dual use of the sensors for parking space length determination as well as for distance determination allows a reduction in the number of sensors to be used and an increase in the resolution and consequently the accuracy of the function reception.

It may be particularly advantageous, in particular for sensors situated laterally on the vehicle, to provide two measuring modes so that a different measuring method may be used for parking space determination and distance determination. In this context, it may be particularly advantageous in the first measuring mode to increase the signal emission frequency for the parking space length determination with respect to the distance determination since this facilitates precise parking space determination even at a high driving speed relative to the parked vehicles.

It may also be advantageous that direct echoes are evaluated in the first measuring mode and that cross echoes are evaluated in addition to the direct echoes in the second measuring mode so that the spatial position of an obstacle is able to be determined. This allows more exact warnings to be provided to the driver. Measuring errors resulting in non-issuance of a warning are able to be prevented.

It may also be particularly advantageous to position the sensors on a front and back vehicle end so that backward as well as forward parking is supported.

It may also be advantageous if acoustic and/or electromagnetic waves are emitted and received by the sensors so that distance determination is rendered possible using a propagation time and/or phase shift and/or frequency shift. The use of inaudible and/or invisible acoustic and/or electric waves is particularly advantageous in this context so that other traffic participants are not disturbed by the measuring operation.

The evaluation is simplified by a central evaluation unit in the vehicle from which warnings may also be issued to the driver.

BRIEF DESCRIPTION OF THE DRAWINGS

Exemplary embodiments of the present invention are shown in the figures and are explained in further detail in the following description.

DETAILED DESCRIPTION OF EXAMPLE EMBODIMENTS

Figure 1:
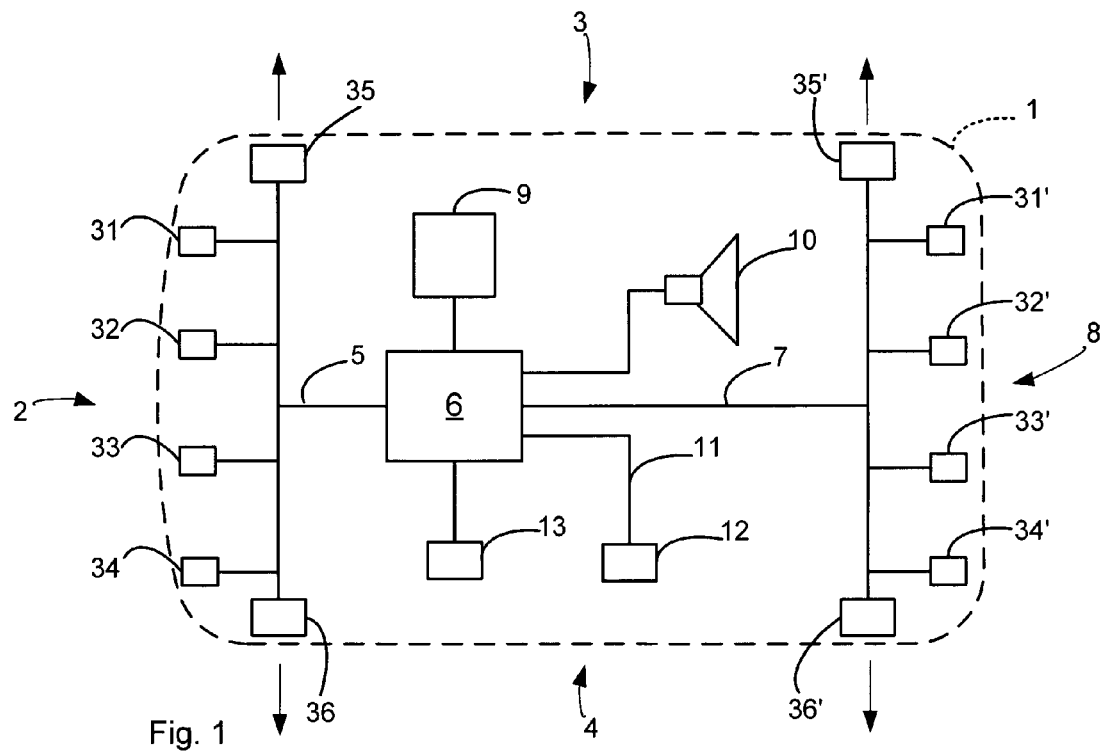
FIG. 1 shows a top view of an exemplary embodiment of a vehicle having sensors and an evaluation unit.

The method of the present invention is preferably used in motor vehicles to be parked in parking spaces parallel to the roadway. However, it is also possible to measure parking spaces running approximately perpendicular to the road. Any distance measuring method may be used in this context, e.g., optical distance measurement via laser or radar or acoustic distance measurement via ultrasound. All indicated measuring methods allow contactless distance measurement. The following explains the method of the present invention on the basis of an application of ultrasonic sensors situated on a vehicle. FIG. 1 shows a top view of a schematic diagram of a sensor configuration in a motor vehicle 1. The outline of motor vehicle 1 is indicated by a dashed line. Four distance sensors 31, 32, 33, 34 are situated on a front side 2 of the vehicle. An additional distance sensor 35 is situated on right vehicle side 3 in the front region of motor vehicle 1. An additional distance sensor 36 is situated on left vehicle side 4 opposite distance sensor 35 on right vehicle side 3. The distance sensors are connected to an evaluation unit 6 via a databus 5. Distance sensors on back side 8 of motor vehicle 1 are also connected to evaluation unit 6 via an additional databus 7. The sensors on vehicle back side 8 are situated in mirror symmetry to the sensors on front vehicle side 2 in a preferred embodiment. Correspondingly, a distance sensor 35' is situated on the right vehicle side, distance sensors 31', 32', 33', 34' are located on the front side, and distance sensor 36' is positioned on the left vehicle side. Each distance sensor is designed as an identical ultrasonic sensor in the exemplary embodiment shown here. In a preferred exemplary embodiment, the ultrasonic sensors are designed as ultrasonic transmission units for transmitting ultrasonic waves in a transmission mode and as ultrasonic receiving units for receiving reflected ultrasonic signals in a receive mode. In a further, preferred exemplary embodiment, a time difference between an emitted and a received signal may be formed by the distance sensors so that the distance between the sensor and an obstacle is able to be directly determined by the distance sensors via databuses 5, 7 from the signal propagation time and may be transmitted to evaluation unit 6. The distance sensors are preferably accommodated in a bumper of the motor vehicle. The sensors are supplied with power either via the lines of databus 5, 7 or via additionally provided power supply lines (not shown in FIG. 1). It is also possible in a further embodiment to individually connect each sensor to evaluation unit 6. In particular the sensors situated on vehicle sides 3, 4 are used during the parking operation to prevent the driver from hitting a parked vehicle with a vehicle corner. It is also possible in a further exemplary embodiment to position only one sensor on vehicle sides 3, 4, preferably in the region of front side 2 of motor vehicle 1. A plausibility check and in particular a measurement when backing the vehicle up are possible via two distance sensors.

Evaluation unit 6 is connected to a display unit 9, via which a measured distance and/or a suitable parking space may be displayed to the driver. Appropriate supporting acoustic warning signals may be emitted via a loudspeaker 10. Evaluation unit 6, which has at least one computing unit, is also connected via an additional vehicle bus system 11, e.g., the CAN bus, to a wheel sensor 12, via which a traveled distance of the vehicle is able to be determined using the wheel speed. Evaluation unit 6 is also connected to a directional sensor 13, which detects operation of a vehicle directional and reports this to evaluation unit 6. Such a message may also be transmitted via vehicle bus system 11. Evaluation unit 6 may also be connected to additional distance measuring devices, e.g., radar measuring devices and/or video-optical measuring devices, which are used in particular for measuring the distance to other vehicles during vehicle operation.

The measuring method of the present invention is rendered possible by two different operating states of the distance measuring system situated in motor vehicle 1, according to FIG. 1. A first measuring mode is used to locate parking spaces. In this measuring mode, signals are emitted either by distance sensors 35, 35' or 36, 36' located on right vehicle side 3 and left vehicle side 4, respectively, as a function of a parking side selected by the user. These signals are either reflected by parked vehicles if the parking space is occupied or, in the case of available spaces, by an obstacle, such as a lateral parking space boundary, a house wall, or a curb, or are lost completely and are not reflected. Therefore, evaluation unit 6 is able to determine as a function of the received signal whether a parking space located next to the vehicle is available. When the vehicle is moving past the parking space, repeated measurements enable a location-dependent determination of whether the parking space is available. A longer, continuous section defines an available space. Evaluation unit 6 compares the length of the parking space to a value that is stored in the evaluation unit and depends on the vehicle dimensions and allows the driver sufficient space to park the vehicle comfortably. The driver may change this value as necessary, e.g., when the driver feel comfortable parking in small parking spaces. In a preferred embodiment, signals are emitted every 20 to 40 ms so that successful measurement is ensured even at high speeds of the vehicle seeking a parking space.

If a parking space suitable for the vehicle is detected, this is displayed to the driver via a suitable display in display unit 9 and acoustic information is provided via loudspeaker 10. If the driver wishes to park in the parking space and the parking space is sufficiently large, the second measuring mode starts preferably automatically. In this mode, not only the sensors positioned on vehicle sides 3, 4 but also the sensors located on front side 2 and back side 8 are operated. A signal emission is performed at a low pulse rate, e.g., all 120 to 240 ms since the vehicle driving speed is quite slow during the parking operation as compared to when driving past the parking space. While laterally positioned distance sensors 35, 35' and 36, 36' only receive the reflected, self-emitted signal in the first measuring mode, a cross echo measurement in which distance sensor 33 receives a signal emitted by distance sensor 31 is also possible in the second measuring mode.

This cross echo measurement allows precise locating of obstacles. Directly received echoes and cross echoes are evaluated in the evaluation unit, and the distance to an obstacle determined from the propagation time of the reflected ultrasonic signal is displayed to the driver in the form of symbols and/or numbers. In addition, the location of the obstacle is preferably displayed to the driver, or the direction of the obstacle is displayed.

Different sensor technologies, e.g., ultrasonic and radar sensors, may be used for the sensors positioned on vehicle sides 3, 4 and for the sensors located on front sides 2, 8. Even when using the same sensor technology, sensors having different opening angles may be used. However, in a preferred embodiment, identical sensor units are used for all sensors so that identical components may be used for the entire distance sensor system of motor vehicle 1 thereby simplifying assembly.

Figure 2:
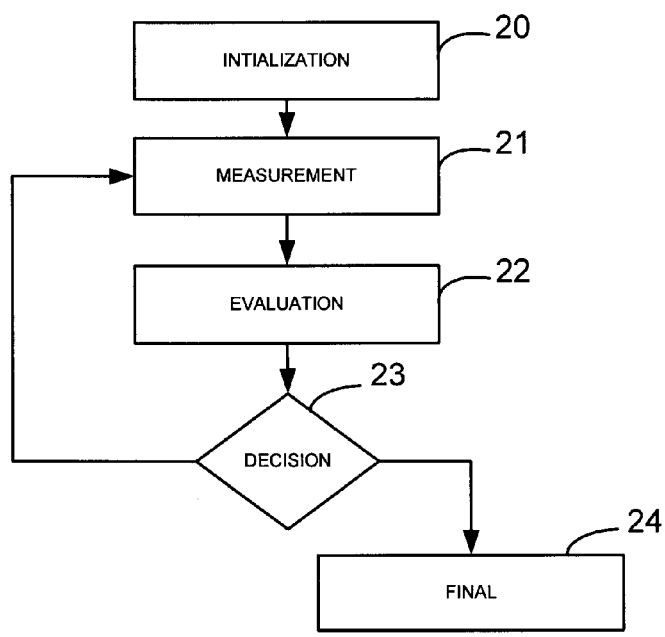
FIG. 2 shows an exemplary embodiment of a sequence of operations according to the present invention.

FIG. 2 shows an exemplary embodiment of the implementation of the method of the present invention. The parking method is introduced by an initialization step 20. In a first embodiment, the user uses, e.g., a control element connected to evaluation unit 6 and not shown in FIG. 1, to input the intent to perform a parking operation on the right or the left vehicle side. In a preferred embodiment, a preferred side, e.g., the right vehicle side for a vehicle in right-hand traffic, is provided as a preferred parking side. When activating the parking device, this side is selected as a preference and must be corrected if the user wishes to park on the left vehicle side. In a further embodiment, the method of the present invention may also be activated by operating the directional. Operation of the directional is detected by directional sensor 13 and is transmitted to evaluation unit 6. A plausibility check is used in a subsequent measurement to check whether the driver really intends to park or turn. If a turn operation is subsequently performed, the method for parking is automatically deactivated. Initialization step 20 is followed by a measurement step 21, in which, depending on the side selection, distance sensors 35, 35' on right vehicle side 3 or distance sensors 36, 36' on left vehicle side 4 are operated preferably at a high pulse rate.

Measurement step 21 is followed by an evaluation step 22, in which the length of a detected parking space is determined as soon as the laterally positioned distance sensors detect an appropriate parking space, i.e., they detect a lateral distance of the vehicle from a road edge or a road boundary that is wide enough to accommodate the motor vehicle. The previously determined distance from an obstacle located next to the vehicle, preferably the distance from a vehicle parked in front of or behind the parking space, is used as the basic distance between motor vehicle 1 and the start of the parking space. Evaluation unit 6 uses the distance values or wheel speed values provided by wheel sensor 12 to be able to determine a traveled distance. In particular, this renders it possible to determine the length of a parking space located next to the vehicle. If the end of the parking space is reached or a predefined parking space length is exceeded, a decision step 23 follows. In decision step 23, evaluation unit 6 checks whether the parking space is large enough to accommodate motor vehicle 1. If this is not the case, the method of the present invention continues with measurement step 21. The driver is shown that a suitable parking space has not yet been located. If applicable, the measured length of the parking space, in particular for parking spaces having a length greater than 1.5 m, may also be displayed. However, if it is determined that the parking space is sufficiently large, appropriate information is provided to the driver visually and/or acoustically, and the distance sensors switch to the second measuring mode in which all sensors are operated and signals are emitted at a low signal sequence with respect to the first measuring mode. In particular, distance sensors 35, 35' and 36, 36' also participate in this measurement. The parking operation ends with a final step 24 when the parking operation is complete or discontinued.

The invention claimed is:

1. A method for parking a vehicle, comprising:
    determining distances of the vehicle from obstacles via a plurality of sensors, at least one of a length and a width of a parking space being determined by at least some of the sensors;
    measuring a distance from boundaries of the parking space by the sensors when subsequently parking in the parking space; and
    issuing a warning signal to a driver when the measured distance drops below a predefined distance from an obstacle,
    wherein the sensors are operated in a first measuring mode when determining the at least one of the length and the width of the parking space, and in a second measuring mode when determining the distance from the boundaries of the parking space.

2. The method as recited in claim 1, wherein a frequency of a signal emission is greater in the first measuring mode than in the second measuring mode.

3. The method as recited in claim 2, wherein direct echoes are evaluated in the first measuring mode, and direct echoes and cross echoes are evaluated in the second measuring mode.

4. The method as recited in claim 1, wherein sensors are operated on a front and a back end of the vehicle, and at least some of the sensors on the front and back end of the vehicle are operated laterally on the vehicle.

5. The method as recited in claim 1, wherein at least one of acoustic and electromagnetic waves are emitted by the sensors, and the at least one of the acoustic and electromagnetic waves are reflected and then received by the sensors.

6. The method as recited in claim 1, further comprising:
    evaluating the data acquired by the sensors by a control unit in the vehicle; and
    outputting warnings or messages.

7. The method of claim 1, wherein the plurality of sensors are substantially identical to each other.

8. The method of claim 1, wherein each of the plurality of sensors is an ultrasound sensor.

9. The method of claim 1, wherein at least some of the sensors used for the determining the at least one of the length and the width of the parking space are also used for the measuring the distance from the boundaries of the parking space.

10. A device for parking a vehicle, comprising:
    a plurality of sensors to determine distances of the vehicle from an obstacles, at least one of a length and a width of a parking space being determined by at least some of the sensors; and
    an arrangement configured to measure a distance from boundaries of the parking space, via at least some of the sensors, when parking, and to issue a warning signal to a driver when the measured distance drops below a predefined distance from the obstacle,
    wherein the sensors are operated in a first measuring mode when determining the at least one of the length and the width of the parking space, and in a second measuring mode when determining the distance from the boundaries of the parking space.

11. The device of claim 10, wherein the plurality of sensors are substantially identical to each other.

12. The device of claim 10, wherein each of the plurality of sensors is an ultrasound sensor.

13. The device of claim 10, wherein at least some of the sensors used for the determining the at least one of the length and the width of the parking space are also used for the measuring the distance from the boundaries of the parking space.

* * * * *